United States Patent
Xu et al.

(10) Patent No.: US 10,418,936 B2
(45) Date of Patent: Sep. 17, 2019

(54) FAULT DETECTION AND POSITIONING SYSTEM FOR CELL PANEL IN LARGE-SCALE PHOTOVOLTAIC ARRAY

(71) Applicant: Suzhou Radiant Photovoltaic Technology Co., Ltd., Suzhou, Jiangsu (CN)

(72) Inventors: Jianrong Xu, Jiangsu (CN); Feng Zhou, Jiangsu (CN); Fei Xu, Jiangsu (CN); Yufeng Xie, Jiangsu (CN); Lecheng Zhou, Jiangsu (CN); Wenzhong Bao, Jiangsu (CN)

(73) Assignee: SUZHOU RADIANT PHOTOVOLTAIC TECHNOLOGY CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 16/093,319

(22) PCT Filed: Aug. 25, 2016

(86) PCT No.: PCT/CN2016/096748
§ 371 (c)(1),
(2) Date: Oct. 12, 2018

(87) PCT Pub. No.: WO2017/177604
PCT Pub. Date: Oct. 19, 2017

(65) Prior Publication Data
US 2019/0149089 A1 May 16, 2019

(30) Foreign Application Priority Data
Apr. 13, 2016 (CN) .......................... 2016 1 0227187

(51) Int. Cl.
*G01R 31/20* (2006.01)
*H02S 50/10* (2014.01)
(Continued)

(52) U.S. Cl.
CPC .............. *H02S 50/10* (2014.12); *H02J 3/383* (2013.01); *H02S 10/00* (2013.01); *H02S 40/30* (2014.12); *H02S 50/00* (2013.01)

(58) Field of Classification Search
CPC .......... H02S 50/10; H02S 40/30; H02S 40/32; H02S 40/34; H02S 10/00; H02J 3/383;
(Continued)

(56) References Cited

U.S. PATENT DOCUMENTS 8,482,309 B2   7/2013  Miyata
9,837,957 B2 * 12/2017  Kouno .................. G01R 27/02
(Continued)

FOREIGN PATENT DOCUMENTS

CN   101893678 A   11/2010
CN   102288856 A   12/2011
(Continued)

OTHER PUBLICATIONS

Hu Yi-Hua, Deng Yan, He Xiang-Ding (Zhejiang UNIVERSiTY, Hangzhou 310027, China), "A Summary on PV Array Fault Diagnosis Method", Mar. 2013, vol. 47, No. 3, Power Electronics.

*Primary Examiner* — Thang X Le
(74) *Attorney, Agent, or Firm* — Muncy, Geissler, Olds & Lowe, P.C.

(57) ABSTRACT

A fault detection and positioning system for a cell panel in a large-scale photovoltaic array, includes a first photovoltaic panel fault detection and positioning system, a second photovoltaic panel fault detection and positioning system, and/or a third photovoltaic panel fault detection and positioning system. The detection and positioning system can detect faults of panels in the photovoltaic array in real time, especially accurately positioning a photovoltaic panel in which a fault occurs; the number of sensors can be mini-
(Continued)

mized, so that the detection costs can be reduced; and the system can be easily implemented and mounted in existing power stations.

14 Claims, 8 Drawing Sheets

(51) Int. Cl.
 *H02S 50/00* (2014.01)
 *H02S 40/30* (2014.01)
 *H02J 3/38* (2006.01)
 *H02S 10/00* (2014.01)

(58) Field of Classification Search
 CPC ....... H02J 7/35; G01R 31/26; G01R 31/2603; G01R 31/2605; G01R 31/28; G01R 31/405; G01R 31/31924; G01R 31/31922; G01R 31/31937; G01N 21/88; G01N 27/06; G01N 27/07; G01N 27/28; G01N 27/30; H02M 7/66; H01L 31/02021
 See application file for complete search history.

(56) References Cited

U.S. PATENT DOCUMENTS

| | | | |
|---|---|---|---|
| 2009/0207543 A1* | 8/2009 | Boniface | H02H 3/16 361/86 |
| 2013/0106402 A1 | 5/2013 | Deboy | |
| 2013/0285670 A1* | 10/2013 | Yoshidomi | G01R 31/025 324/510 |
| 2015/0188487 A1* | 7/2015 | Yoshidomi | H02S 50/10 324/761.01 |
| 2016/0006392 A1* | 1/2016 | Hoft | H02S 50/10 361/78 |
| 2017/0063304 A1* | 3/2017 | Ko | H02S 40/32 |
| 2017/0250541 A1* | 8/2017 | Adest | H02M 3/1582 |
| 2018/0278206 A1 | 9/2018 | Tan et al. | |

FOREIGN PATENT DOCUMENTS

| | | |
|---|---|---|
| CN | 102288856 A | 12/2011 |
| CN | 102362360 A | 2/2012 |
| CN | 102565663 A | 7/2012 |
| CN | 102867871 A | 1/2013 |
| CN | 103944508 A | 1/2013 |
| CN | 103674964 A | 3/2014 |
| CN | 103715983 A | 4/2014 |
| CN | 104485888 A | 4/2015 |
| CN | 104601108 A | 5/2015 |
| CN | 104704702 A | 6/2015 |
| CN | 104704702 A | 6/2015 |
| CN | 205051650 U | 2/2016 |
| JP | 2012084809 A | 4/2012 |
| JP | 2013175662 A | 9/2013 |
| JP | 2015079799 A | 4/2015 |
| KR | 20140112877 | 9/2014 |
| KR | 20140112877 A | 9/2014 |

\* cited by examiner

FAULT DETECTION AND POSITIONING SYSTEM FOR CELL PANEL IN LARGE-SCALE PHOTOVOLTAIC ARRAY

BACKGROUND OF THE INVENTION

Field of Invention

The present invention relates to a photovoltaic power generation, and a fault detection and positioning system for cell panel in large-scale photovoltaic array, and, more particularly to a system and method detecting and positioning a fault solar cell panel.

Description of Prior Art

With the growing shortage of petrochemical energy, solar photovoltaic power generation has become an increasingly important alternative to energy. The prior art discloses that a photovoltaic array is a core component of a photovoltaic power generation system, and is composed of several photovoltaic cell panels connected in series and in parallel. In the process of production and use, due to the outdoor environment and the large number of photovoltaic cell panels, the photovoltaic cell panels often fail and are not replaced in time. The efficiency of photovoltaic array power generation is seriously affected. Therefore, how to conveniently monitor the power generation of the photovoltaic array and timely detect and locate the fault panel is a key issue to improve the efficiency of the power plant operation.

At present, the prior art photovoltaic power generation system fault detection method has the following limitations: for example, One class based on the infrared image detection method, as disclosed in Chinese patent (Application No. 201310605759.8) that a device for detecting defects of solar panels by using an infrared thermal imager, by using a movable frame and a light shielding plate to construct detection space for infrared thermal image to determine the fault location and fault type on a photovoltaic panel, and the problems with this type of method are: the frame and shielding plate are difficult to set up, the state where the temperature difference is not obvious is difficult to distinguish, the real-time response is poor, and it is difficult to realize online fault diagnosis and alarm, etc.

Another category is a time-domain reflection based on high-frequency signal injection (A Summary on PV Array Fault Diagnosis Method, Power Electronics, March 2013, Vol. 47, No. 3), wherein the principle is to inject high frequency signal into the photovoltaic panel and detect by its reflected signal. The fault detection and positioning of the photovoltaic array is performed according to different changes of the reflected signal, and the method is not real-time, and has high requirements on equipment and limited diagnostic accuracy.

Another category bases on sensor-based fault diagnosis methods and various improvements for this, wherein this category of methods can achieve online fault diagnosis and location to a certain extent such as Chinese patent (application number 201310737368.1) disclosed a device for detecting current and voltage faults of photovoltaic panel strings, wherein the device can measure in real time, but can only perform fault analysis on strings, not on the panel, which still requires a large labor cost for large photovoltaic power plants on panel inspection, and manually measured data is very inconvenient to preserved, post-processed and analysis; Chinese patent (application number 201080001447.0) disclosed a fault detection method for solar power generation system, in which, the current value of each solar cell module or the current value of each solar cell string and the total current value of the entire solar power generation system are measured, fault is determined by calculated, but the method has the problem that the current sensor is too much and the cost is too high; Chinese patent (Application No. 201010251723.0) proposed a method for saving the number of sensors, which firstly parallels the battery boards into one layer and then connects with several layers in series (TCT Structure) to detect the fault of the panel by examining the maximum current value of each layer. However, at present, the structure of photovoltaic power plants is mainly serial-parallel (SP-structure), so the structure of this patent (application number 201010251723.0) needs to change the original mainstream photovoltaic array connection mode and is lack of compatibility and economy in the application; Chinese patent (application number 201210015861.8) proposed a method for saving the number of sensors for the mainstream SP structure panel array, wherein M boards of each string with detection accuracy of L Underneath need at least M/L sensors, but this method has obvious disadvantages: the number of sensors required for each string of panels is still large, and if high resolution is required, the number of sensors is still the same as the number of cell panels, moreover, the measurement range of voltage of each sensor in the method is different, which brings trouble for the selection of the sensor, at the same time, the method has special requirements for the position disposed the sensor, which brings complexity to the installation of the power station.

Accordingly, based on the current state of the art, the inventor of the present application proposes a photovoltaic panel fault detection system capable of real-time online monitoring, a small number of sensors, high electrical detection accuracy, and easy installation and implementation for the mainstream panel array structure.

SUMMARY OF THE INVENTION

In view of the above, the present invention provides a real-time online panel fault detection and positioning system for photovoltaic array, and particularly relates to a fault detection and positioning system for cell panel in large-scale photovoltaic array, and more particularly to a fault detection and positioning system structure and method for solar panel. The invention can accurately locate a faulty photovoltaic panel and can minimize the number of sensors and is easy to implement and install in existing power plants.

In order to achieve above-mentioned object of the present invention, one embodiment of the present invention provides a fault detection and positioning system for cell panel in large-scale photovoltaic array including a first photovoltaic panel fault detection and positioning system, a second photovoltaic panel fault detection and positioning system, and/or a third photovoltaic panel fault detection and positioning system.

one embodiment of the present invention provides a first photovoltaic panel fault detection and positioning system includes:

a cell panel array connected first in series and then in parallel, including n cell strings connected in parallel, wherein each of the cell strings includes m cell panels connected in series;

a plurality of check boxes A, wherein each check box A connects with one of the cell strings to detect a state of the cell string;

a plurality of panel voltage detection circuit bundles, wherein each panel voltage detection circuit bundle connects with all cell panels of one of the cell strings and connects with the check box A corresponding to this cell string;

a monitoring terminal connected to all of the check boxes A for receiving data from the check boxes A and transmitting control signals to the check boxes A; and an environmental parameter detection module connected to the monitoring terminal for transmitting an environment parameter to the monitoring terminal, wherein the check box A includes:

a string current detection module, a panel voltage detection module; and a control module, wherein the string current detection module connects with a string current circuit in series to detect a current parameter of the corresponding cell string of the check box A, and an output of the string current detection module connects with the control module, wherein panel voltage detection module connects with one of the panel voltage detection circuit bundle to detect a voltage parameter of the cell panel of the corresponding cell string, and an output of panel voltage detection module connects with the control module, wherein the control module connects with the string current detection module and the panel voltage detection module to control, collect data and operate the string current detection module and the panel voltage detection module, and the control module connects with the monitoring terminal to transmit data and to receive the control signal from the monitoring terminal.

In one embodiment of the present invention, wherein the panel voltage detection module includes a voltage sensor, and m power switches, wherein each power switch connects with a voltage detection circuit of one of the cell panels in series, and the voltage sensor connects with a terminal of the voltage detection circuit. The control module turns on each power switch in turn to connect the voltage detection circuit of each cell panel to the voltage sensor to get a voltage parameter of each cell panel of the cell string.

In one embodiment of the present invention, wherein the string current detection module further includes a current sensor connected to the string current circuit in series, wherein an output of the current sensor connects with the control module.

One embodiment of the present invention provides an operation process of the first photovoltaic panel fault detection and positioning system includes steps of:

step (1.1) starting to monitor by the monitoring terminal;

step (1.2) detecting by the control module of each check box A every predetermined time interval;

step (1.3) sampling a current value from the string current detection module by the control module;

step (1.4) turning on the power switch of each cell panel in turn by the control module at the same time with step (1.3) and sampling a voltage value of each cell panel;

step (1.5) computing by the control module according to the current value and the voltage value;

step (1.6) transmitting the result of computing and data to the monitoring terminal by the control module;

step (1.7) sampling the environment parameter at the same time by the monitoring terminal;

step (1.8) computing with data from all the control modules and the environment parameters by the monitoring terminal to providing an analysis result of a power station operation, wherein the analysis result includes a position indicator of the fault cell panel.

step (1.9) determining whether the degree of fault has reached a set level by a user requiring repair and maintaining the power station and repairing the fault cell panel if it reached the level requiring repair, or returning to step (1.2) if not; and step (1.10) returning to step (1.1) if the maintaining and the repairing is finished.

The first photovoltaic panel fault detection and positioning system and corresponding operation process of the invention can overcome the problem of too many sensors of the existing sensor-based detection method, and only one current sensor and one voltage sensor are needed for each string that's reducing the cost significantly. At the same time, the embodiment of the invention also has the advantages of good real-time detection, online detection without disturbing the operation of the power station, and automatic formation of a database for later analysis.

Based on the existing current collection box module with current detection function, one embodiment of the present invention provides a second photovoltaic panel fault detecting and positioning system includes:

a cell panel array connected first in series and then in parallel, including n cell strings connected in parallel, wherein each of the cell strings includes m cell panels connected in series;

a plurality of check boxes B, wherein each check box B connects with one of the cell strings to detect a state of the cell string;

a plurality of panel voltage detection circuit bundles, wherein each panel voltage detection circuit bundle connects with all cell panels of one of the cell strings and connects with the check boxes B corresponding to this cell string;

a current collection box with current detection function connected to current circuits of a plurality of cell strings, and the current collection box including a first output and a second output, wherein the first output provides electrical power;

a monitoring terminal connected to all of the check boxes B for receiving data from the check boxes B and transmitting control signals to the check boxes B, wherein the second output of the current collection box transmits a detection result of each string current to the monitoring terminal and the monitoring terminal received a detection result of each string current from the current collection box; and an environmental parameter detection module connected to the monitoring terminal for transmitting an environment parameter to the monitoring terminal.

In one embodiment of the present invention, wherein the check box B includes a panel voltage detection module, and a control module, wherein the panel voltage detection module connects with one of the panel voltage detection circuit bundle to detect a voltage parameter of each cell panels of the cell string, and an output of the panel voltage detection module connects with the control module, wherein the control module connects with the panel voltage detection module to control, collect data and operate the panel voltage detection module, and the control module connects with the monitoring terminal to transmit data and to receive the control signal from the monitoring terminal.

In one embodiment of the present invention, wherein the panel voltage detection module of the second photovoltaic panel fault detection and positioning system includes a voltage sensor, and m power switches, wherein each power switch connects with a voltage detection circuit of one of the cell panels in series, and the voltage sensor connects with a terminal of the voltage detection circuit.

One embodiment of the present invention provides an operation process of the second photovoltaic panel fault detection and positioning system includes steps of:

step (2.1) starting to monitor by the monitoring terminal;

step (2.2) detecting by the control module of each check box B every predetermined time interval;

step (2.3) turning on the power switch of each cell panel in turn by the control module and sampling a voltage value of each cell panel;

step (2.4) computing by the control module according to the voltage value;

step (2.5) transmitting the result of computing and data to the monitoring terminal by the control module;

step (2.6) sampling each string current value from the current collection box by the monitoring terminal at the same time;

step (2.7) sampling the environment parameter at the same time with step (2.6) by the monitoring terminal;

step (2.8) computing with sampling data to providing an analysis result of a power station operation by the monitoring terminal, wherein the analysis result includes a position indicator of the fault cell panel.

step (2.9) determining whether the degree of fault has reached a set level by a user requiring repair and maintaining the power station and repairing the fault cell panel if it reached the level of requiring repair, or returning to step (2.2) if not; and step (2.10) returning to step (2.1) if the maintaining and the repairing is finished.

The operation process of the second photovoltaic panel fault detection and positioning system and the corresponding of the invention have the following effects: on the basis of the advantages of the first photovoltaic panel fault detection and positioning system and the corresponding operation process provided by the present invention, fully utilizing the original current detection data of the current collection box in the power station and further reducing the cost of adding new detection module.

In order to further reduce the detection cost, one embodiment of the present invention provides a third photovoltaic panel fault detection and positioning system, including:

a cell panel array connected first in series and then in parallel, including 2n cell strings connected in parallel, wherein each of the cell strings includes m cell panels connected in series;

a plurality of check boxes C, wherein each check box C connects with two of the cell strings connected in parallel to detect states of the cell strings;

a plurality of panel voltage detection circuit bundles, wherein each panel voltage detection circuit bundle connects with all cell panels of two of the cell strings connected in parallel and the check boxes C corresponding to these two cell strings;

a current collection box with current detection function connected to current circuits of a plurality of cell strings, and the current collection box including a first output and a second output, wherein the first output provides electrical power;

a monitoring terminal connected to all of the check boxes C for receiving data from the check boxes C and transmitting control signals to the check boxes C, wherein the second output of the current collection box transmits a detection result of each string current to the monitoring terminal and the monitoring terminal received a detection result of each string current from the current collection box; and an environmental parameter detection module connected to the monitoring terminal for transmitting an environment parameter to the monitoring terminal.

In one embodiment of the present invention, the check box C includes a second panel voltage detection module, and a control module, wherein the second panel voltage detection module connects with one of the panel voltage detection circuit bundle to detect a voltage parameter of each cell panel of two cell strings connected in parallel, and an output of the second panel voltage detection module connects with the control module, wherein the control module connects with the second panel voltage detection module to control, collect data and operate the second panel voltage detection module, and the control module connects with the monitoring terminal to transmit data and to receive the control signal from the monitoring terminal In one embodiment of present invention, the second panel voltage detection module includes a voltage sensor, and 2m power switches, wherein each power switch connects in series to a voltage detection circuit of one of the cell panels of the two cell strings connected in parallel, and the voltage sensor connects with a terminal of the voltage detection circuit, wherein the control module turns on each power switch in turn to connect the voltage detection circuit of each cell panel to the voltage sensor to get the voltage parameter of each cell panel of these two cell strings connected in parallel.

One embodiment of the present invention provides an operation process of the third photovoltaic panel fault detection and positioning system includes steps the same with the operation process of the second photovoltaic panel fault detection and positioning system.

In one embodiment of the present invention, wherein the check box C includes a second panel voltage detection module connects with at least three cell strings connected in parallel, the second panel voltage detection module includes a plurality of power switches, and the number of the power switches is the same with the number of the cell panels of the cell strings.

The third photovoltaic panel fault detection and positioning system provided by the present invention has the effect that the cost of the newly added detecting component is greatly reduced on the basis of the advantages of the second photovoltaic panel fault detecting and positioning system provided by the present invention.

In one embodiment of the present invention, wherein the panel voltage detection module of the first second photovoltaic panel fault detecting and positioning system connects with one of the panel voltage detection circuit bundle to detect a voltage parameter of each cell panel of two cell strings connected in parallel, and an output of the panel voltage detection module connects with the control module, wherein the control module connects with the panel voltage detection module to control, collect data and operate the panel voltage detection module, and the control module connects with the monitoring terminal to transmit data and to receive the control signal from the monitoring terminal.

That is, the structure included in the detection box C in the third photovoltaic panel fault detection and positioning system of the present invention can also be used for the panel detection module and the control module in the first photovoltaic panel fault detection and positioning system to achieve the effect of substantially reducing the detection cost of the first photovoltaic panel fault detection and positioning system.

DETAILED DESCRIPTION OF THE PREFERRED EMBODIMENTS

The following description of the embodiments is provided by reference to the following drawings and illustrates the specific embodiments of the present invention. Directional terms mentioned in the present invention, such as "up," "down," "top," "bottom," "forward," "backward," "left," "right," "inside," "outside," "side," "peripheral," "central," "horizontal," "peripheral," "vertical," "longitudinal," "axial," "radial," "uppermost" or "lowermost," etc., are merely indicated the direction of the drawings. Therefore, the directional terms are used for illustrating and understanding of the application rather than limiting thereof.

Embodiment 1

Figure 1:
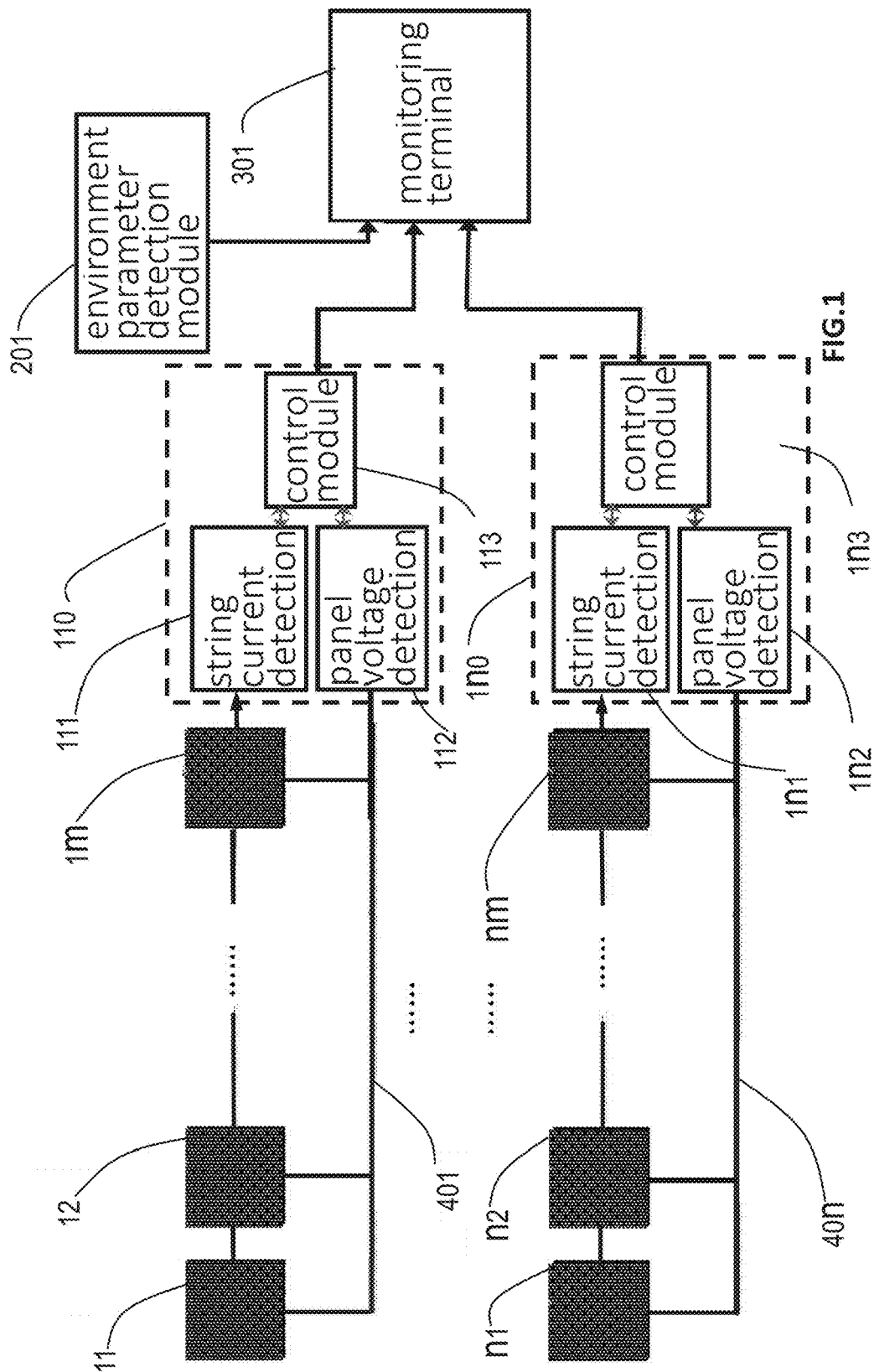
FIG. 1 is a schematic block diagram showing the first photovoltaic panel fault detection and positioning system according to one embodiment of the present invention.

FIG. 1 is a schematic block diagram showing the first photovoltaic panel fault detection and positioning system according to one embodiment of the present invention. The first photovoltaic panel fault detection and positioning system includes a serial-parallel cell panel array connected first in series and then in parallel, including n cell strings connected in parallel, wherein each of the cell strings includes m cell panels connected in series, as shown in FIG. 1. The panels 11, 12, ..., 1m are connected in series to form a first cell string, and the panels n1, n2, ..., nm are connected in series to form an nth cell string, etc., and these n cell strings are connected in parallel, and connected to the current collection box (here for the sake of simplicity, not marked in the figure)

Referring to FIG. 1 and FIG. 2A, a first step 11 of a method 10 of manufacturing a display panel according to one embodiment of the present invention is to provide a substrate 21. In this step 11, the substrate 21 is, for example, a substrate used for carrying the gate, the gate insulating layer, the polysilicon layer, the interlayer dielectric layer, and the first electrode pattern layer. In one embodiment, the substrate 21 is, for example, a flexible substrate, a transparent substrate, or a flexible transparent substrate.

The first photovoltaic panel fault detection and positioning system further includes a plurality of n check boxes A 110, ..., 1n0, wherein each check box A connects with one of the cell strings to detect a state of the cell string. The check box A 110 connects with the first cell string, and the check box A 1n0 connects with the nth cell string.

The first photovoltaic panel fault detection and positioning system further includes a plurality of panel voltage detection circuit bundles 401, 402, ..., 40n, wherein each panel voltage detection circuit bundle connects with all cell panels of one of the cell strings and connects with the check box A corresponding to this cell string. For example, one side of the panel voltage detection circuit bundle 401 receives all panel voltage detection circuit from cell panel 11, 12, ..., 1m and another side of the panel voltage detection circuit bundle 401 connects with panel voltage detection module 112 inside the check box A 110. One side of the panel voltage detection circuit bundle 40n receives all panel voltage detection circuit from cell panel n1, n2, ..., nm and another side of the panel voltage detection circuit bundle 40n connects with panel voltage detection module n12 inside the check box A n10.

The first photovoltaic panel fault detection and positioning system further includes a monitoring terminal 301 connected to all of the check boxes A 110, ..., 1n0 for receiving data from the check boxes A 110, ..., 1n0 and transmitting control signals to the check boxes A 110, ..., 1n0.

The first photovoltaic panel fault detection and positioning system further includes an environmental parameter detection module 201 connected to the monitoring terminal 301 for transmitting an environment parameter to the monitoring terminal 301.

The structures inside the check box A 11, ..., 1n0 are all the same.

For example, the check box A 110 includes a string current detection module 111, a panel voltage detection module 112, and a control module 113.

The string current detection module 111 connects with the first cell string (includes cell panels 11, 12, ..., 1m) in series to sample the current parameter of the first cell string, and an output of the string current detection module 111 connects with the control module 113.

The panel voltage detection module 112 detects the voltage parameter of each cell panel 11, 12, ..., 1m of the first cell string. The panel voltage detection module 112 connects with the panel voltage detection circuit bundle 401, and an output of panel voltage detection module 112 connects with the control module 113.

The control module 113 connects with the string current detection module 111 and the panel voltage detection module 112 to control, collect data and operate the string current detection module 111 and the panel voltage detection module 112, and the control module 113 connects with the monitoring terminal 301 to transmit data and to receive the control signal from the monitoring terminal 301.

Embodiment 2

Figure 2:
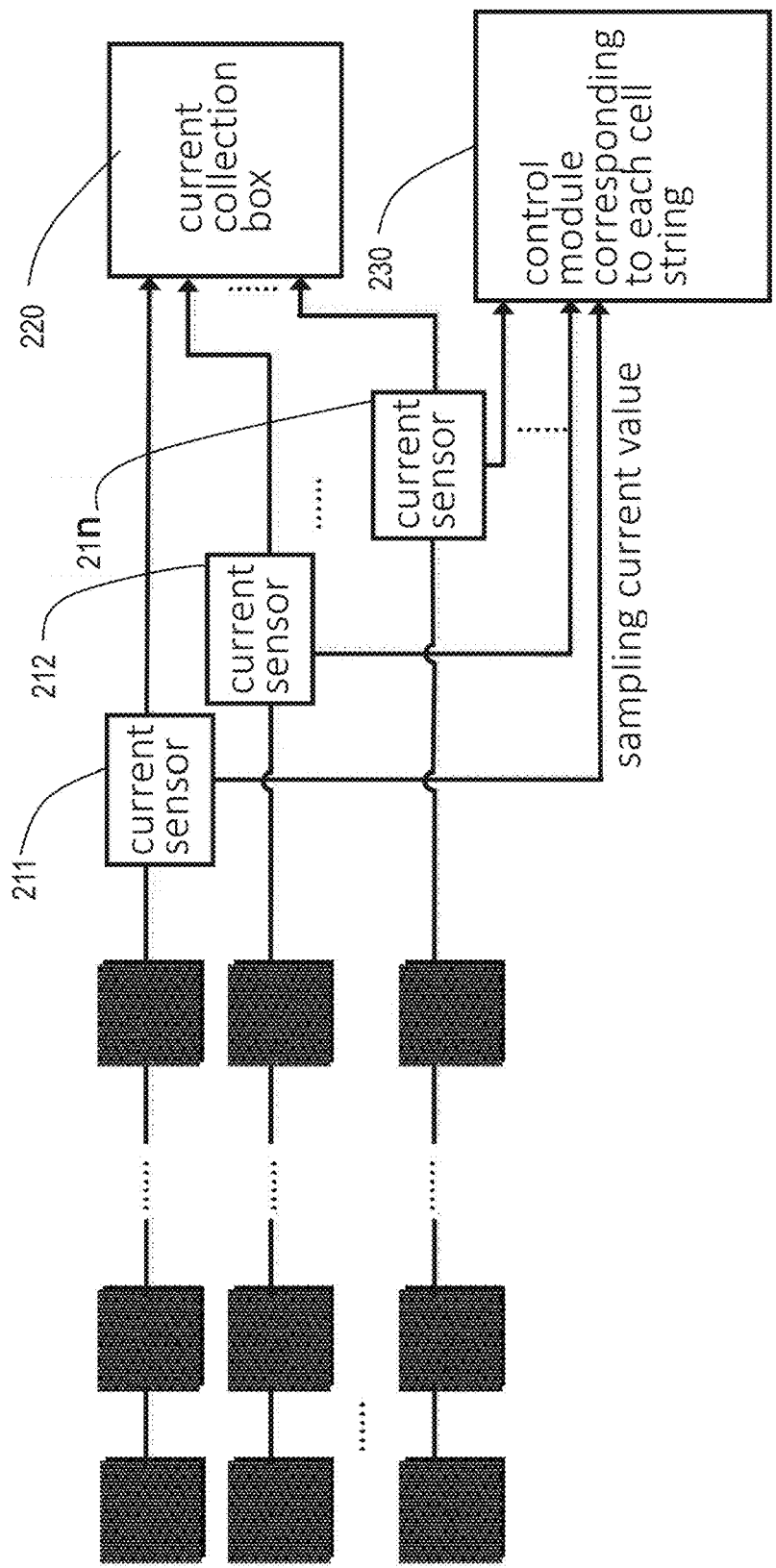
FIG. 2 is a schematic block diagram of the string current detection module of the first photovoltaic panel fault detection and positioning system according to one embodiment of the present invention.
Figure 3:
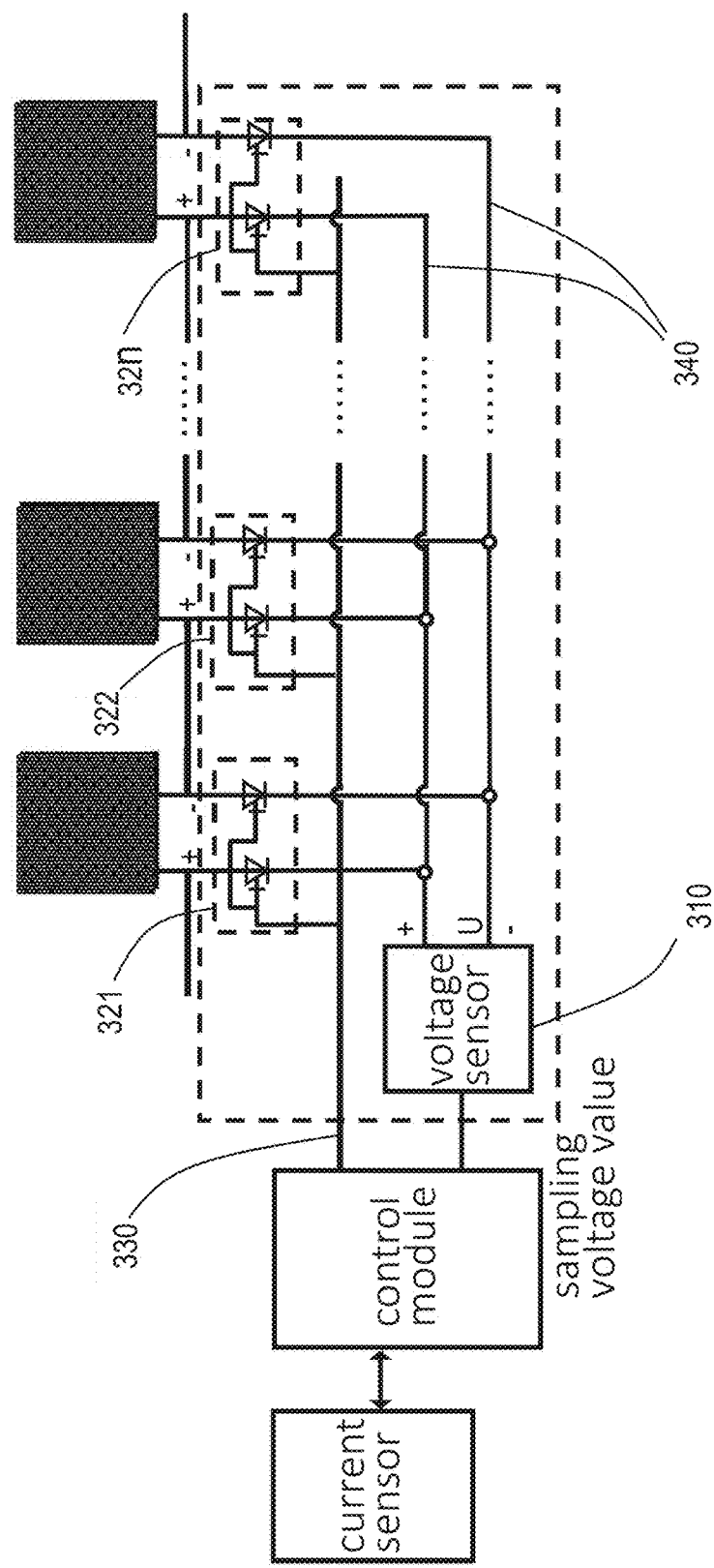
FIG. 3 is a schematic block diagram of the panel voltage detection module of the first photovoltaic panel fault detection and positioning system according to one embodiment of the present invention.

FIG. 2 is an embodiment of the string current detection module of the first photovoltaic panel fault detection and positioning system of the present invention. There is a current sensor 211 connected between each cell string and current collection box. The current sensor 211 is used to detect the current of the cell string. The output of the current sensor 211 connects with the control module of the check box A connected to this cell string as shown in FIG. 1. FIG. 3 disclose an embodiment of the panel voltage detection module of the first photovoltaic panel fault detection and positioning system of the present invention. For the sake of simplicity, FIG. 3 shows only one panel voltage detection module corresponding to one cell string as an example. The power switches 321, 322, . . . 32n connect with local detection circuit 351, 352, . . . , 35n separately. The control signal circuit 330 connects the control terminal of power switches 321, 322, . . . , 32n. The control signal circuit 330 come from the output of the control module. The local detection circuits of cell panels connect to form a panel voltage detection circuit 340 after passing through the power switch 321, 322, . . . , 32n separately and then the panel voltage detection circuit 340 connects with voltage sensor 310. The voltage value sampled by the voltage sensor 301 is transmitted to the control module. The control module connects with the monitoring terminal.

The control module turns on each power switch 321, 322, . . . , 32n in turn by control signal transmitted on control signal circuit 330 to connect the local detection circuit of voltage signal of each cell panel with the voltage sensor 310 to get a voltage parameter of each cell panel and then to transmit the voltage parameter to the control module.

Figure 4:
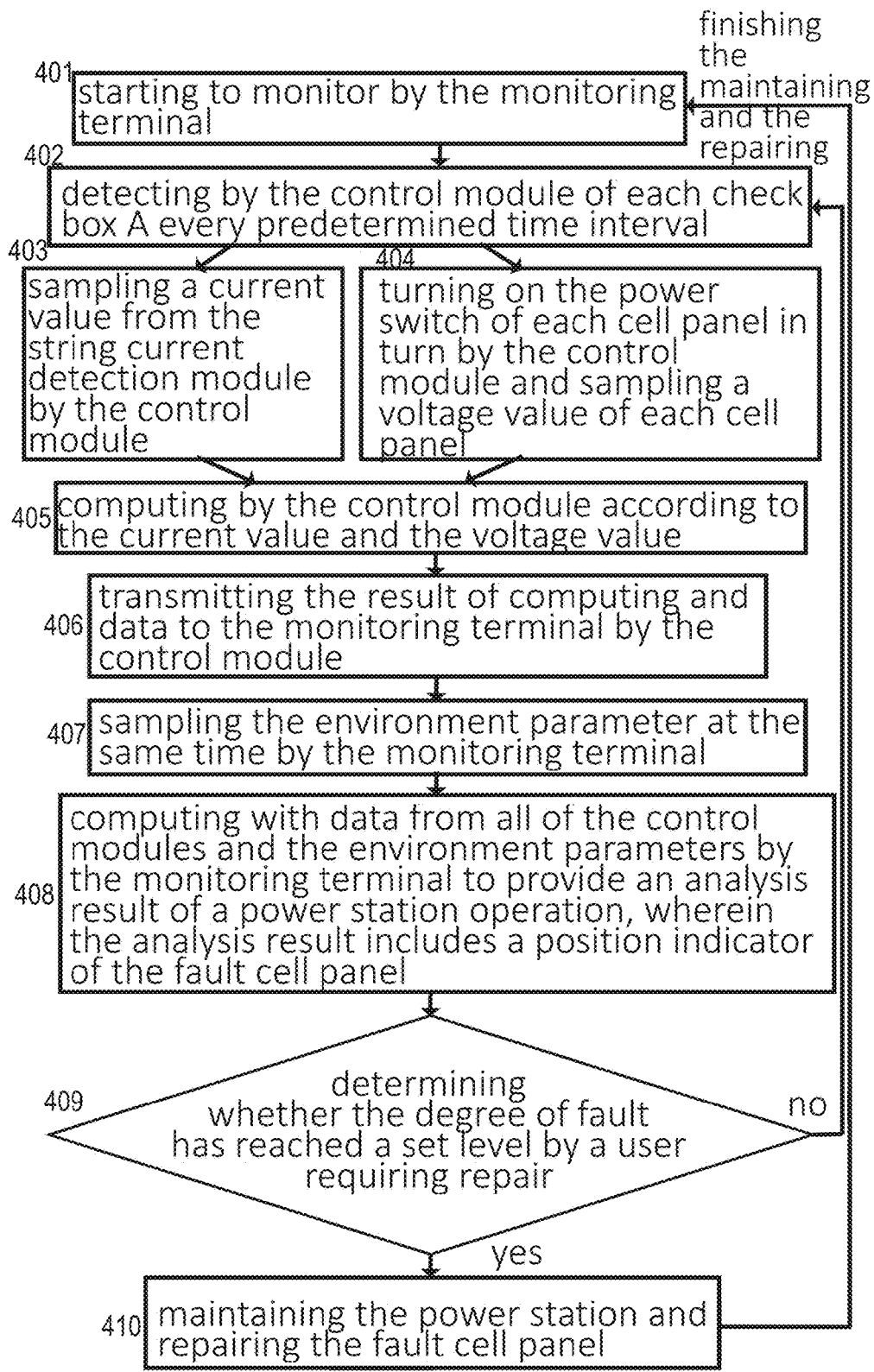
FIG. 4 is a schematic flow chart of the operation process of the first photovoltaic panel fault detection and positioning system according to one embodiment of the present invention.

Please refer to FIG. 1 and FIG. 4. FIG. 4 discloses the operation process of the first photovoltaic panel fault detection and positioning system according to one embodiment of the present invention.

The operation process includes: step (401) starting to monitor by the monitoring terminal 301; step (402) detecting by the control module 113, . . . , 1n3 of each check box A 110, . . . , 1n0 every predetermined time interval; step (403) sampling current values from the string current detection modules 111, . . . , 1n1 by the control modules 113, . . . , 1n3; step (404) turning on the power switch of each cell panel in turn by the control module 113, . . . , 1n3 at the same time with step (403) and sampling a voltage value of each cell panel; step (405) computing by the control module 113, . . . , 1n3 according to the current value and the voltage value; step (406) transmitting the result of computing and data to the monitoring terminal 301 by the control module 113, . . . , 1n3; step (407) sampling the environment parameter from the environment parameter detection module 201 at the same time by the monitoring terminal 301; step (408) computing with data from all the control modules and the environment parameters by the monitoring terminal 301 to providing an analysis result of a power station operation, wherein the analysis result includes a position indicator of the fault cell panel; step (409) determining whether the degree of fault has reached a set level set by a user requiring repair by the monitoring terminal and entering step (410) if it reached the level of requiring repair, or returning to step (402) if not; and step (410) maintaining the power station and repairing the fault cell panel and returning to step (401) if the maintaining and the repairing is finished.

Embodiment 3

Figure 5:
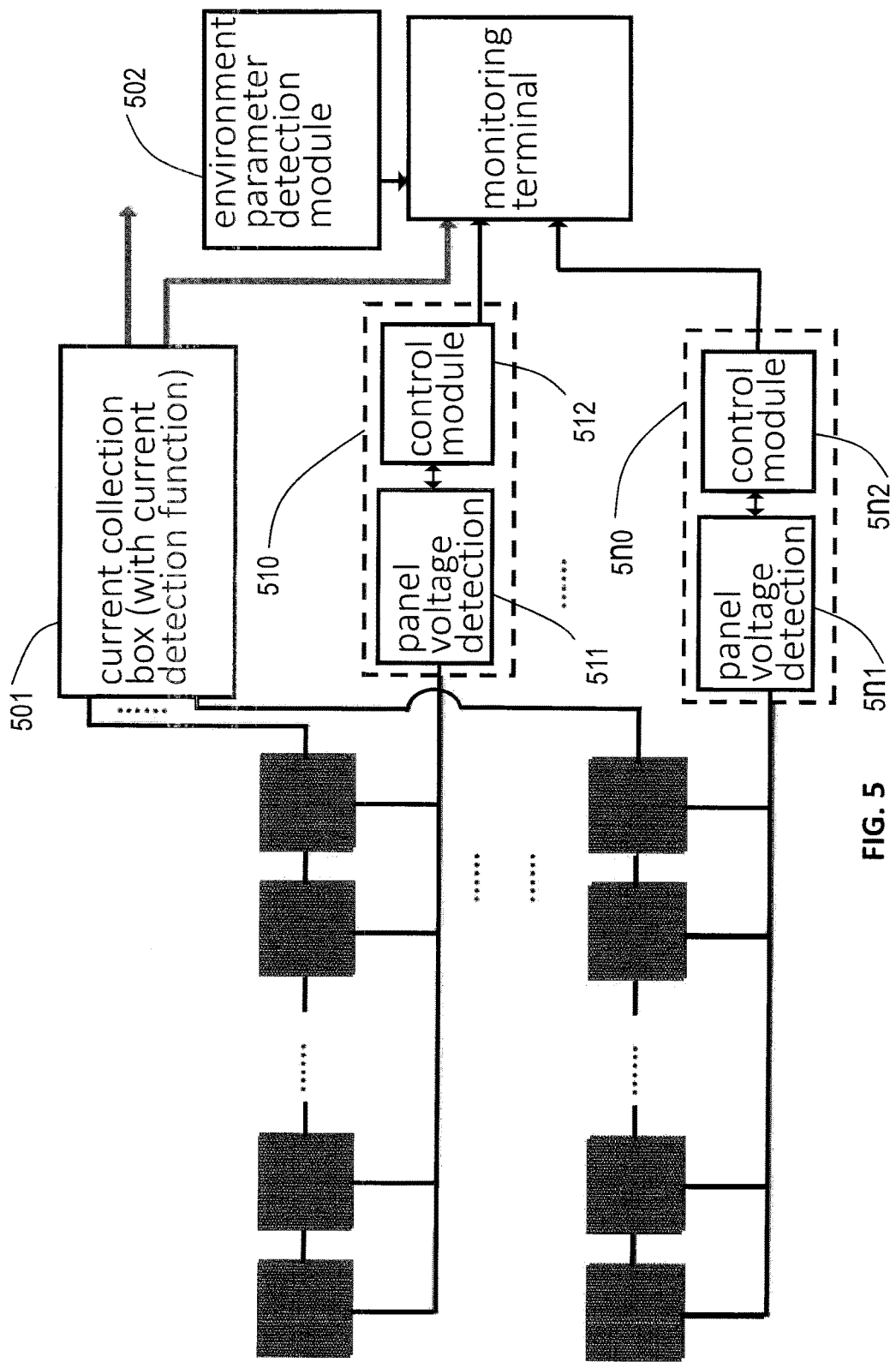
FIG. 5 is a schematic block diagram showing the second photovoltaic panel fault detection and positioning system according to one embodiment of the present invention.

Base on the current collection module with current detection function of prior art, the invention provides one embodiment of a structure of second photovoltaic panel fault detection and positioning system, as shown in FIG. 5. The second photovoltaic panel fault detection and positioning system includes a cell panel array connected first in series and then in parallel the same as the cell panel array as shown in FIG. 1. The cell panel array includes n cell strings connected in parallel, wherein each of the cell strings includes m cell panels connected in series.

The second photovoltaic panel fault detection and positioning system further includes a plurality of check boxes B 510, . . . , 5n0, wherein each check box B connects with one of the cell strings to detect a state of the cell string. In FIG. 5, check box B 510 connects with the first cell string, and the check box B 5n0 connects with the nth cell string.

The second photovoltaic panel fault detection and positioning system as shown in FIT. 5 further includes a plurality of panel voltage detection circuit bundles the same as the structure shown in FIG. 1, wherein each panel voltage detection circuit bundle connects all cell panels of one of the cell strings and connects the check boxes B corresponding to this cell string.

The second photovoltaic panel fault detection and positioning system further includes a current collection box 501 with current detection function connected to current circuits of a plurality of cell strings, and the current collection box including a first output and a second output, wherein the first output provides electrical power;

The second photovoltaic panel fault detection and positioning system further includes a monitoring terminal connected to all of the check boxes B 510, . . . , 5n0 for receiving data from the check boxes B 510, . . . , 5n0 and transmitting control signals to the check boxes B 510, . . . , 5n0, wherein the second output of the current collection box 501 transmits a detection result of each string current to the monitoring terminal and the monitoring terminal received a detection result of each string current from the current collection box 501.

The second photovoltaic panel fault detection and positioning system further includes an environmental parameter detection module 502 connected to the monitoring terminal for transmitting an environment parameter to the monitoring terminal.

The structures inside the check box B 510, . . . , 5n0 are all the same. For example, the check box B 510 includes a panel voltage detection module 511, and a control module 512. The panel voltage detection module 511 detects the voltage parameter of each cell panel of the cell string. The panel voltage detection module 511 connects with one panel voltage detection circuit bundle, and an output of panel voltage detection module 511 connects with the control module 512. The control module 512 connects with the panel voltage detection module 511 to control, collect data and operate the panel voltage detection module 511, and the control module 512 connects with the monitoring terminal to transmit data and to receive the control signal from the monitoring terminal.

The structure of the panel voltage detection module 511 is the same with the structure of the panel voltage detection module in FIG. 3.

Embodiment 4

Figure 6:
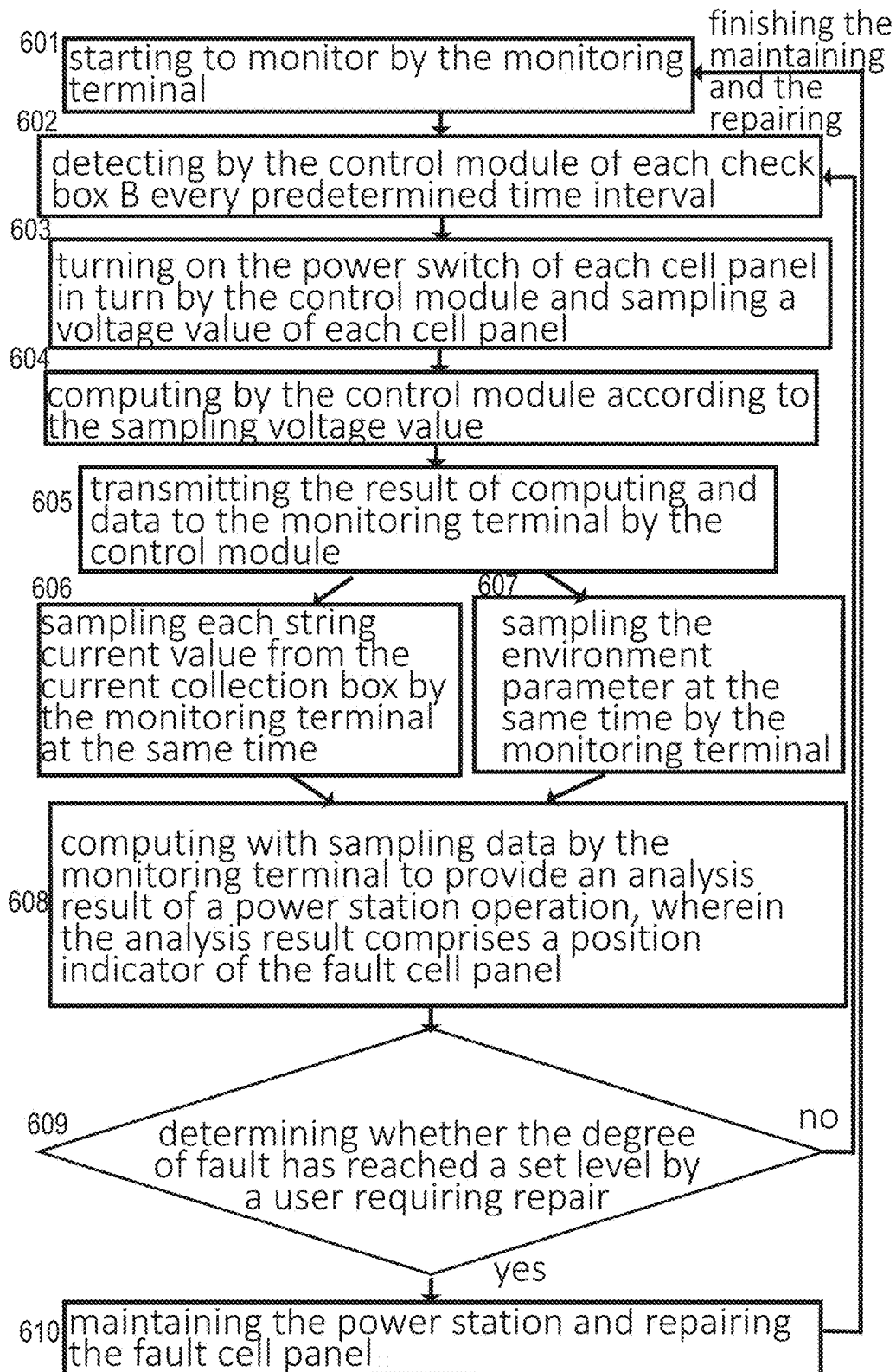
FIG. 6 is a schematic flow chart of the operation process of the second photovoltaic panel fault detection and positioning system according to one embodiment of the present invention.

Please refer to FIG. 5 and FIG. 6. The invention provides an embodiment of the operation process of the second photovoltaic panel fault detection and positioning system according to one embodiment of the present invention.

The operation process includes: step (601) starting to monitor by the monitoring terminal 301;

step (602) detecting by the control module of each check box B every predetermined time interval;

step (603) turning on the power switch of each cell panel in turn by the control module and sampling a voltage value of each cell panel;

step (604) computing by the control module according to the voltage value;

step (605) transmitting the result of computing and data to the monitoring terminal by the control module;

step (606) sampling each string current value from the current collection box by the monitoring terminal at the same time;

step (607) sampling the environment parameter from the environment parameter module 502 at the same time with step (606) by the monitoring terminal;

step (608) computing with sampling data to providing an analysis result of a power station operation by the monitoring terminal, wherein the analysis result includes a position indicator of the fault cell panel;

step (609) determining whether the degree of fault has reached a set level by a user requiring repair and entering step (610) if reached the level of requiring repair, or returning to step (602) if not; and step (610) maintaining the power station and repairing the fault cell panel and returning to step (601) if the maintaining and the repairing is finished.

Embodiment 5

Figure 7:
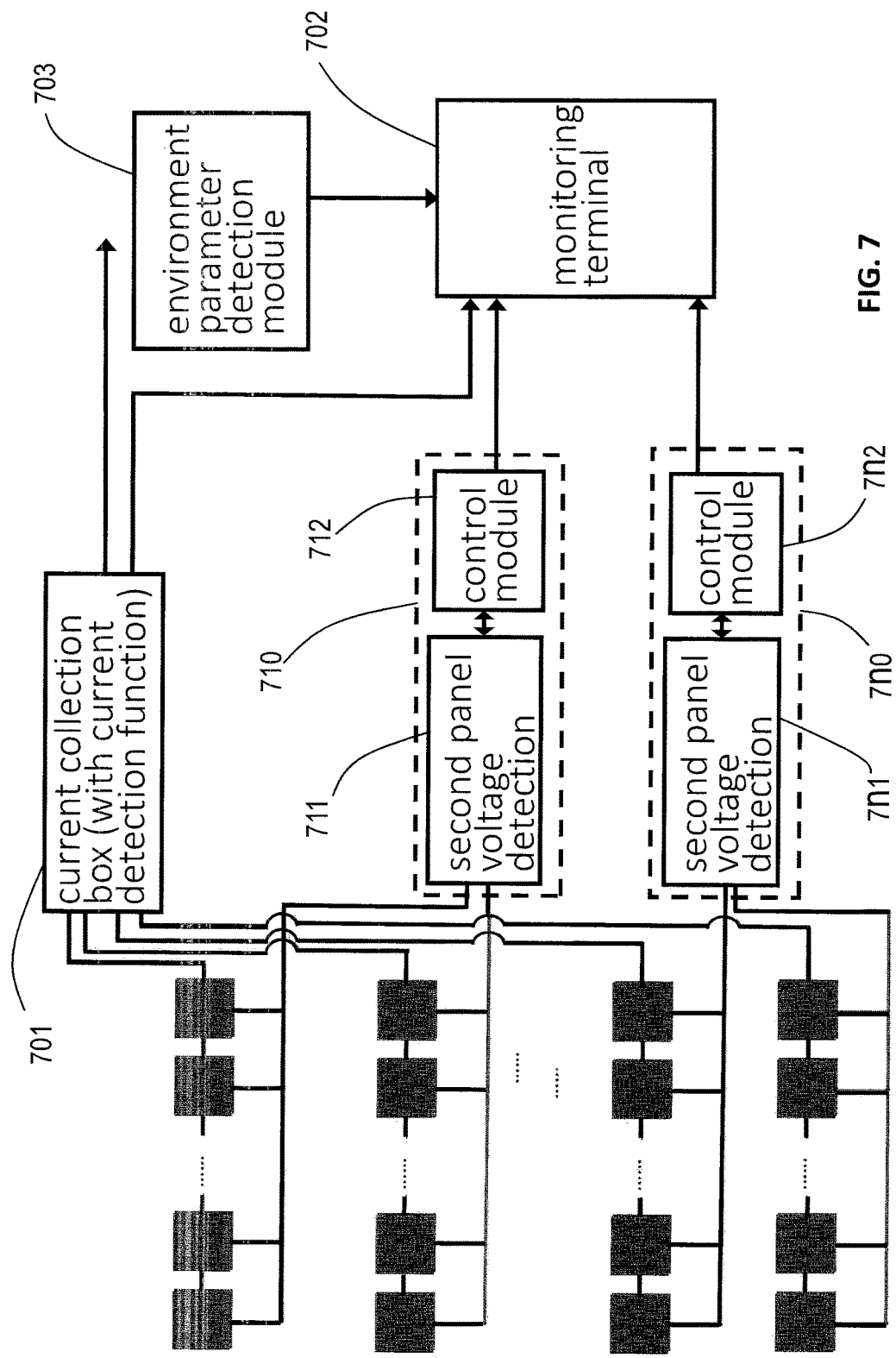
FIG. 7 is a schematic block diagram showing the third photovoltaic panel fault detection and positioning system according to one embodiment of the present invention.

Please refer to FIG. 7. FIG. 7 discloses a structure of the third photovoltaic panel fault detection and positioning system according to one embodiment of the present invention. The third photovoltaic panel fault detection and positioning system includes a cell panel array connected first in series and then in parallel, including 2n cell strings connected in parallel, wherein each of the cell strings includes m cell panels connected in series;

The third photovoltaic panel fault detection and positioning system further includes a plurality of check boxes C $710, \ldots, 7n0$, wherein each check box C connects with two of the cell strings connected in parallel to detect states of the cell strings;

The third photovoltaic panel fault detection and positioning system further includes a plurality of panel voltage detection circuit bundles, wherein each panel voltage detection circuit bundle connects all cell panels of two of the cell strings connected in parallel and the check boxes C corresponding to these two cell strings;

The third photovoltaic panel fault detection and positioning system further includes a current collection box 701 with current detection function connected to current circuits of a plurality of cell strings, and the current collection box including a first output and a second output, wherein the first output provides electrical power;

The third photovoltaic panel fault detection and positioning system further includes a monitoring terminal 702 connected to all of the check boxes C $710, \ldots, 7n0$ for receiving data from the check boxes C $710, \ldots, 7n0$ and transmitting control signals to the check boxes C$710, \ldots, 7n0$, wherein the second output of the current collection box transmits a detection result of each string current to the monitoring terminal 702 and the monitoring terminal 702 received a detection result of each string current from the current collection box 701; and The third photovoltaic panel fault detection and positioning system further includes an environmental parameter detection module 703 connected to the monitoring terminal 702 for transmitting an environment parameter to the monitoring terminal 702.

The structures inside the check box C $710, \ldots, 7n0$ are all the same. For example, the check box C 710 includes a second panel voltage detection module 711, and a control module 712. The second panel voltage detection module 711 detects the voltage parameter of each cell panel of two cell strings connected in parallel. The second panel voltage detection module 711 connects with one panel voltage detection circuit bundle, and an output of second panel voltage detection module 711 connects with the control module 712. The control module 712 connects with the second panel voltage detection module 711 to control, collect data and operate the second panel voltage detection module 711, and the control module 712 connects with the monitoring terminal 702 to transmit data and to receive the control signal from the monitoring terminal 702.

Embodiment 6

Figure 8:
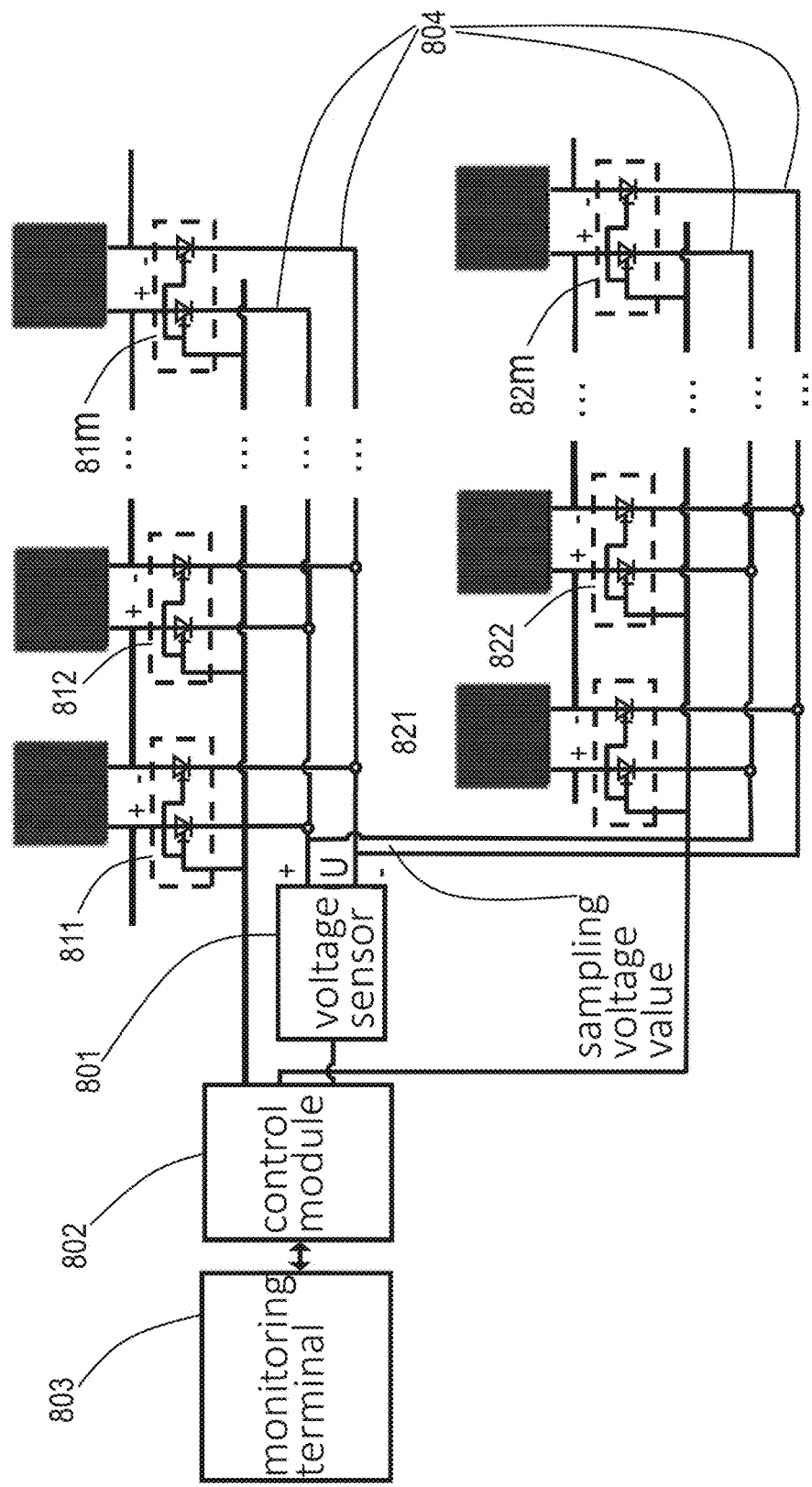
FIG. 8 is a schematic block diagram showing the panel voltage detection module of the third photovoltaic panel fault detection and positioning system according to one embodiment of the present invention.

Please refer to FIG. 8. FIG. 8 is a schematic block diagram showing the panel voltage detection module of the third photovoltaic panel fault detection and positioning system as shown in FIG. 7 according to one embodiment of the present invention. The second panel voltage detection module includes a voltage sensor 801 and 2m power switches 811, $812, \ldots, 81m, 821, 822, \ldots, 82m$ (the number of the cell panels in one string is m), wherein each power switch connects in series to a voltage detection circuit of one of the cell panels of the two cell strings connected in parallel, and the voltage sensor 801 connects a terminal of the voltage detection circuit 804, wherein the control module 802 turns on each power switch in turn to connect the voltage detection circuit of each cell panel to the voltage sensor 801 to get 2m voltage parameters of 2m cell panels of these two cell strings connected in parallel.

The operation process corresponding to the structure in FIG. 7 is the same with the operation process in FIG. 6. The third photovoltaic panel fault detection and positioning system as shown in FIG. 7 can extend to connect three, four or more cell strings in parallel to a second panel voltage detection module. Correspondingly, the number of the power switches of the second panel voltage detection module is the same with the number of the cell panels of the corresponding cell strings.

The panel detection module and the control module of the first photovoltaic panel fault detection and positioning system as shown in FIG. 1 may modify and follow the structure of check box C as shown in FIG. 8 to reduce detection cost of the first photovoltaic panel fault detection and positioning system.

The present invention has been described by the above embodiments, but the embodiments are merely examples for implementing the present invention. It must be noted that the embodiments do not limit the scope of the invention. In contrast, modifications and equivalent arrangements are intended to be included within the scope of the invention.

What is claimed is:

1. A fault detection and positioning system for cell panel in large-scale photovoltaic array, comprising:
    a first photovoltaic panel fault detection and positioning system;
    a second photovoltaic panel fault detection and positioning system; and
    a third photovoltaic panel fault detection and positioning system, wherein the first photovoltaic panel fault detection and positioning system comprises:
        a cell panel array connected first in series and then in parallel, comprising n cell strings connected in parallel, wherein each of the cell strings comprises m cell panels connected in series;
a plurality of check boxes A, wherein each check box A connects with one of the cell strings to detect a state of the cell string;
a plurality of panel voltage detection circuit bundles, wherein each panel voltage detection circuit bundle connects with all cell panels of one of the cell strings and connects with the check box A corresponding to this cell string;
a monitoring terminal connected to all of the check boxes A for receiving data from the check boxes A and transmitting control signals to the check boxes A; and
an environmental parameter detection module connected to the monitoring terminal for transmitting an environment parameter to the monitoring terminal, wherein the check box A comprises:
a string current detection module;
a panel voltage detection module; and
a control module, wherein the string current detection module connects with a string current circuit in series, and an output of the string current detection module connects with the control module, wherein the panel voltage detection module connects with one of the panel voltage detection circuit bundles, and an output of the panel voltage detection module connects with the control module, wherein the control module further connects with the monitoring terminal, wherein the panel voltage detection module comprises:
a voltage sensor; and
m power switches, wherein each power switch connects with a voltage detection circuit of one of the cell panels in series, and the voltage sensor connects with a terminal of the voltage detection circuit.

2. The fault detection and positioning system for cell panel in large-scale photovoltaic array according to claim 1, wherein the control module turns on each power switch in turn to connect the voltage detection circuit of each cell panel with the voltage sensor to get a voltage parameter of each cell panel of the cell string.

3. The fault detection and positioning system for cell panel in large-scale photovoltaic array according to claim 1, wherein the string current detection module further comprises a current sensor connected to the string current circuit in series, wherein an output of the current sensor connects with the control module.

4. The fault detection and positioning system for cell panel in large-scale photovoltaic array according to claim 1, wherein an operation process of the first photovoltaic panel fault detection and positioning system comprises steps of:
step (1.1) starting to monitor by the monitoring terminal;
step (1.2) detecting by the control module of each check box A every predetermined time interval;
step (1.3) sampling a current value from the string current detection module by the control module;
step (1.4) turning on the power switch of each cell panel in turn by the control module at the same time with step (1.3) and sampling a voltage value of each cell panel;
step (1.5) computing by the control module according to the current value and the voltage value;
step (1.6) transmitting the result of computing and data to the monitoring terminal by the control module;
step (1.7) sampling the environment parameter at the same time by the monitoring terminal;
step (1.8) computing with data from all the control modules and the environment parameters by the monitoring terminal to providing an analysis result of a power station operation, wherein the analysis result comprises a position indicator of the fault cell panel;
step (1.9) determining whether the degree of fault has reached a set level by a user requiring repair by the monitoring terminal and maintaining the power station and repairing the fault cell panel if it reached the level of requiring repair, or returning to step (1.2) if not; and
step (1.10) returning to step (1.1) if the maintaining and the repairing is finished.

5. The fault detection and positioning system for cell panel in large-scale photovoltaic array according to claim 1, wherein the second photovoltaic panel fault detection and positioning system comprises:
a cell panel array connected first in series and then in parallel, comprising n cell strings connected in parallel, wherein each of the cell strings comprises m cell panels connected in series;
a plurality of check boxes B, wherein each check box B connects with one of the cell strings to detect a state of the cell string;
a plurality of panel voltage detection circuit bundles, wherein each panel voltage detection circuit bundle connects all cell panels of one of the cell strings and connects the check boxes B corresponding to this cell string;
a current collection box with current detection function connected to current circuits of a plurality of cell strings, and the current collection box comprising a first output and a second output, wherein the first output provides electrical power;
a monitoring terminal connected to all of the check boxes B for receiving data from the check boxes B and transmitting control signals to the check boxes B, wherein the second output of the current collection box transmits a detection result of each string current to the monitoring terminal and the monitoring terminal received a detection result of each string current from the current collection box; and
an environmental parameter detection module connected to the monitoring terminal for transmitting an environment parameter to the monitoring terminal.

6. The fault detection and positioning system for cell panel in large-scale photovoltaic array according to claim 5, wherein the check box B comprises:
a panel voltage detection module; and
a control module, wherein the panel voltage detection module connects with one of the panel voltage detection circuit bundle to detect a voltage parameter of each cell panels of the cell string, and an output of the panel voltage detection module connects with the control module, wherein the control module connects the panel voltage detection module to control the panel voltage detection module, to collect data from the panel voltage detection module, and to operate the data, and the control module connects with the monitoring terminal to transmit data and to receive the control signal from the monitoring terminal.

7. The fault detection and positioning system for cell panel in large-scale photovoltaic array according to claim 6, wherein the panel voltage detection module comprises:
a voltage sensor; and
m power switches, wherein each power switch connects with a voltage detection circuit of one of the cell panels in series, and the voltage sensor connects a terminal of the voltage detection circuit.

8. The fault detection and positioning system for cell panel in large-scale photovoltaic array according to claim 5, wherein an operation process of the second photovoltaic panel fault detection and positioning system comprises steps of:
step (2.1) starting to monitor by the monitoring terminal;
step (2.2) detecting by the control module of each check box B every predetermined time interval;
step (2.3) turning on the power switch of each cell panel in turn by the control module and sampling a voltage value of each cell panel;
step (2.4) computing by the control module according to the voltage value;
step (2.5) transmitting the result of computing and data to the monitoring terminal by the control module;
step (2.6) sampling each string current value from the current collection box by the monitoring terminal at the same time;
step (2.7) sampling the environment parameter at the same time with step (2.6) by the monitoring terminal;
step (2.8) computing with sampling data to providing an analysis result of a power station operation by the monitoring terminal, wherein the analysis result comprises a position indicator of the fault cell panel;
step (2.9) determining whether the degree of fault has reached a set level by a user requiring repair and maintaining the power station and repairing the fault cell panel if it reached the level of requiring repair, or returning to step (2.2) if not; and
step (2.10) returning to step (2.1) if the maintaining and the repairing has finished.

9. The fault detection and positioning system for cell panel in large-scale photovoltaic array according to claim 1, wherein the third photovoltaic panel fault detection and positioning system comprises:
a cell panel array connected first in series and then in parallel, comprising 2n cell strings connected in parallel, wherein each of the cell strings comprises m cell panels connected in series;
a plurality of check boxes C, wherein each check box C connects with two of the cell strings connected in parallel to detect states of the cell strings;
a plurality of panel voltage detection circuit bundles, wherein each panel voltage detection circuit bundle connects all cell panels of two of the cell strings connected in parallel and the check boxes C corresponding to these two cell strings;
a current collection box with current detection function connected to current circuits of a plurality of cell strings, and the current collection box comprising a first output and a second output, wherein the first output provides electrical power;
a monitoring terminal connected to all of the check boxes C for receiving data from the check boxes C and transmitting control signals to the check boxes C, wherein the second output of the current collection box transmits a detection result of each string current to the monitoring terminal and the monitoring terminal received a detection result of each string current from the current collection box; and
an environmental parameter detection module connected to the monitoring terminal for transmitting an environment parameter to the monitoring terminal.

10. The fault detection and positioning system for cell panel in large-scale photovoltaic array according to claim 9, wherein the check box C comprises:
a second panel voltage detection module; and
a control module, wherein the second panel voltage detection module connects with one of the panel voltage detection circuit bundle to detect a voltage parameter of each cell panel of two cell strings connected in parallel, and an output of the second panel voltage detection module connects with the control module, wherein the control module connects the second panel voltage detection module to control the panel voltage detection module, to collect data from the panel voltage detection module, and to operate the data, and the control module connects with the monitoring terminal to transmit data and to receive the control signal from the monitoring terminal.

11. The fault detection and positioning system for cell panel in large-scale photovoltaic array according to claim 10, wherein the second panel voltage detection module comprises:
a voltage sensor; and
2m power switches, wherein each power switch connects in series to a voltage detection circuit of one of the cell panels of the two cell strings connected in parallel, and the voltage sensor connects a terminal of the voltage detection circuit, wherein the control module turns on each power switch in turn to connect the voltage detection circuit of each cell panel to the voltage sensor to get the voltage parameter of each cell panel of these two cell strings connected in parallel.

12. The fault detection and positioning system for cell panel in large-scale photovoltaic array according to claim 9, wherein an operation process of the third photovoltaic panel fault detection and positioning system comprises steps of:
step (3.1) starting to monitor by the monitoring terminal;
step (3.2) detecting by the control module of each check box C every predetermined time interval;
step (3.3) turning on the power switch of each cell panel in turn by the control module and sampling a voltage value of each cell panel;
step (3.4) computing by the control module according to the voltage value;
step (3.5) transmitting the result of computing and data to the monitoring terminal by the control module;
step (3.6) sampling each string current value from the current collection box by the monitoring terminal at the same time;
step (3.7) sampling the environment parameter at the same time with step (3.6) by the monitoring terminal;
step (3.8) computing with sampling data to providing an analysis result of a power station operation by the monitoring terminal, wherein the analysis result comprises a position indicator of the fault cell panel;
step (3.9) determining whether the degree of fault has reached a set level by a user requiring repair and maintaining the power station and repairing the fault cell panel if it reached the level of requiring repair, or returning to step (3.2) if not; and
step (3.10) returning to step (3.1) if the maintaining and the repairing is finished.

13. The fault detection and positioning system for cell panel in large-scale photovoltaic array according to claim 9, wherein the check box C comprises a second panel voltage detection module connects with at least three cell strings connected in parallel, the second panel voltage detection module comprises a plurality of power switches, and the number of the power switches is the same with the number of the cell panels of the corresponding cell strings.

14. The fault detection and positioning system for cell panel in large-scale photovoltaic array according to claim 1, wherein the panel voltage detection module connects with one of the panel voltage detection circuit bundle to detect a voltage parameter of each cell panel of two cell strings connected in parallel, and an output of the panel voltage detection module connects with the control module, wherein the control module connects the panel voltage detection module to control, collect data and operate the panel voltage detection module, and the control module connects with the monitoring terminal to transmit data and to receive the control signal from the monitoring terminal.

* * * * *